Dec. 22, 1959

F. J. DRIEVES 2,918,519

CONNECTOR FOR JOINING SEVERED WIRES

Filed June 24, 1957

FRED J. DRIEVES
INVENTOR.

BY [signature]
ATTORNEY

United States Patent Office 2,918,519

Patented Dec. 22, 1959

2,918,519

CONNECTOR FOR JOINING SEVERED WIRES

Fred J. Drieves, Elmhurst, N.Y.; Margaret Drieves, executrix of said Fred J. Drieves, deceased Application June 24, 1957, Serial No. 667,468

6 Claims. (Cl. 174—84)

This invention relates to wired connections on electromechanical and electronic devices and is particularly directed to repairs made to wired connections on such devices.

In complex electronic devices, such as television receivers, complicated radio sets and other types of electronic units, on which a multiplicity of components are used, it is frequently necessary to check through the wiring in the circuit connecting the various components in order to ascertain if there is a short-circuit at any point, or if any of the wires connecting several components are internally broken or the insulation damaged thereon, or if any of the components themselves are defective.

Where such work is done in the field, in the home of a television owner, or in a small shop, in which elaborate testing equipment is not generally available, it is frequently necessary in order to localize difficulties which are present, to check individual components independently to isolate them from other parts of the apparatus, and to check the lines connecting such components to other parts of the apparatus in order to ascertain the particular location or connection causing the difficulty.

In order to check individual components, such as condensers and the like, which are permanently wired to other parts of the apparatus, it is frequently necessary to break the connections and wires at various points in order to trace individual components in an effort to localize the difficulties and replace defective or worn components or wires.

Where devices in which a large number of such small components are used, it is necessary to break several of these connections by cutting the wires in order to localize the difficulties so that any defective components can be replaced.

After this is done and the testing of individual components is completed, and the source of the difficulty localized, it is necessary to either reconnect the wires which were cut, or substitute new components for these found to be defective and rewire or reconnect such components to the other parts of the apparatus.

Where the original component, such as a condenser is to be replaced, it has been found to be extremely difficult if not impossible to reconnect the severed connections, as the two sections of the cut wire are too short to touch one another at the junctions to be soldered because of the section of wire that is removed when the line is cut.

Under these conditions, it is necessary to either replace one end of the line by means of a new wire, or to add an additional section at the junction of the wires that were cut and solder the joints in order to form a new electrical connection.

Because of the relative inaccessibility of many of these components in a television receiver or other electronic device, this soldering operation becomes extremely delicate and time consuming, particularly where it is necessary to replace a section of the wire or to add a new wire section close to a terminal, at the junction between the cut wires, and solder it to the two ends of the cut wire.

As the wire connecting the defective part, or the part which after testing is found to be satisfactory, is frequently of necessity cut close to a terminal because of the limited space available, this renders the addition of a wire connection to be soldered to the two parts of the severed line even more difficult due to close space limitations.

Where the original part is to be replaced after testing, it is necessary to reconnect the original lines, either by soldering or other suitable connecting means. Because of the method of cutting generally employed and the initial tension in the wire, there is usually a gap between the severed ends of the wire, which is too difficult to bridge by ordinary soldering means available at these locations.

Even if such joints were soldered, the relatively low shear strength of the type of solder generally employed, as contrasted with the strength of the wire, would render the joint extremely delicate and brittle, so that it would tend to break under vibration, high temperatures or other conditions encountered in the use of the apparatus.

Under the circumstances, soldering by ordinary means cannot usually be satisfactorily employed for this purpose.

The primary object of my invention is to provide a tubular connector which is slipped over the ends of the two severed wires, bridging the sections to be joined, and soldering the ends of the tubular connector to the respective wire sections, thus providing a reliable permanent connection which is electrically satisfactory and can withstand vibration and severe usage to the same extent as the original connecting wire.

This frequently permits the reinsertion of the original components, the connecting lines of which are cut, instead of replacing them and therefore sharply reduces the overall cost of the repairs required.

As the tubular connector may be made of copper, or other suitable material having essentially the same electrical characteristics as the wire to which it is attached, the electrical characteristics of the circuit are unimpaired.

The accompanying drawings, illustrative of one embodiment of my invention, and a modification thereof, together with the description of their construction and the method of attachment and utilization thereof, will serve to clarify further objects and advantages of my invention.

Figure 1:
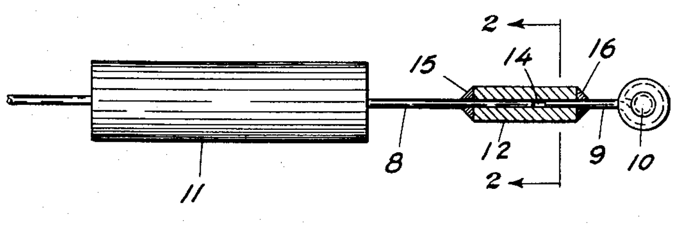
Fig. 1 represents a partial front elevation and partial longitudinal section through one embodiment of the construction, showing the two wire sections, one of which is attached to a terminal, with the tubular metal connector connecting the severed ends of the wires, and the method of connecting the connector to the wires.
Figure 3:
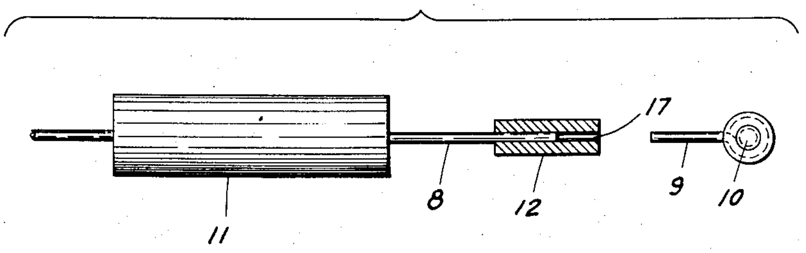

Fig. 3 is a partial front elevation and partial longitudinal section, similar to Fig. 1, through the construction shown in Fig. 1, showing a condenser with one section of the wire projecting therefrom and the tubular connector shown in Fig. 1 attached to the end of the wire, with the other section of the wire which is attached to the terminal, free, preparatory to sliding the tubular connector over the free end of the wire.

Figure 4:
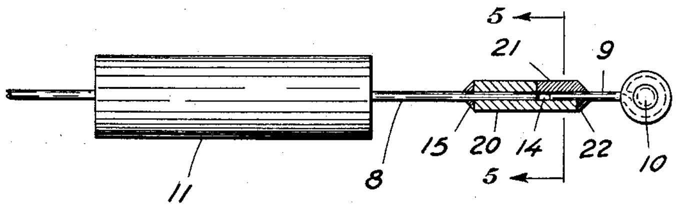

Fig. 4 is a partial front elevation and partial vertical section, similar to Fig. 1, through a modification of the construction shown in Fig. 1, showing the severed ends of the wire with a modified tubular connector attached thereto, the connector having a slot through a portion of one end thereof to enable the slotted end of the connector to be slid over the terminal end of one wire section, after it is attached to the other section thereof.

Figure 5:
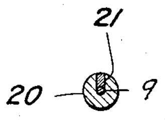
Figure 2:
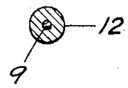
Fig. 2 is a cross-section through the metal connector shown in Fig. 1 and one of the wires to which it is attached, taken on the line 2—2, Fig. 1.

Fig. 5 is a vertical section similar to Fig. 2, through the slotted end of the tubular connector and the wire section shown in Fig. 4, showing the relation between the slot through one wall of the connector and the end of the wire section fitted thereto, taken on the line 5—5, Fig. 4.

It will be understood that the following description of the construction and the method of attachment of the "Connector for joining severed wires in electrical devices,"

is intended as explanatory of the invention and not restrictive thereof.

In the drawings the same reference numerals designate the same parts throughout the various views.

One embodiment of the construction shown in Figs. 1 and 2, shows the two severed sections of wire 8 and 9, one of which is attached to a terminal 10, with the other section attached to a condenser 11, or other type of electronic component, as shown in Fig. 1, the wires being made of copper or other similar conductive material.

A tubular connector 12 is fitted over one section 8 of the wire, after which it is slid along the wires, the circular opening in the center of the connector allowing it to be slid along the wire sections to substantially the position shown in Fig. 1, a narrow gap 14 between the ends of the wire sections being located inside the tubular connector 12.

After the tubular connector 12 is slid into the position shown in Fig. 1, the ends of the connector are soldered, or otherwise permanently attached to the adjacent portions of the wire sections, the soldered joints being located at 15 and 16.

As the connector is made of a highly conductive material, of substantially the same general analysis as the wire sections 8 and 9, the soldered joints 15 and 16 provide a positive connection between the ends of the connector 12 and the wire sections 8 and 9 attached thereto.

As a positive connection is made between each of the wire sections 8 and 9 and the tubular connector 12, and as the combined cross-sectional area of the end of the connector and the attached wire section is considerably greater than that of the individual wire sections 8 and 9, the electrical resistance of the connector itself, or that of the combination of the connector and either of the wire sections is considerably less than that of each of the wire sections 8 and 9, so that the flow of current between one wire section 8 and the other wire section 9 is not reduced, even in the area within the connector, in which there is a gap 14 between the ends of the wire sections.

Fig. 3 shows a front elevation of the construction shown in Figs. 1 and 2, before the tubular connector 12 is slid over the section 9 of the wire, which is attached to the terminal 10.

In the drawing, the tubular connector 12 is fitted over the left-hand section 8 of the wire, which is attached to a condenser 11 or other type of electronic component.

With the wire and the tubular connector in this position, the free end of the connector 12 in which the central opening 17 is exposed, is slid over the right-hand section 9 of the wire, which is attached to the terminal 10, after which the connector 12 is slid further along both wire sections until the tubular connector 12 is located in substantially the position shown in Fig. 1 relative to the wire sections 8 and 9, with a narrow gap 14 located between the two wire sections 8 and 9 inside the connector.

After that, the ends of the connector 12 are soldered to the adjacent wire sections 8 and 9 in the position shown in Fig. 1, thus providing a positive joint between the tubular connector and the two wire sections 8 and 9 in the manner hereinbefore described.

Figs. 4 and 5 show a modification of the construction shown in Figs. 1, 2 and 3. In this construction, the two severed wire sections 8 and 9 are substantially the same as those shown in Figs. 1 and 2, the left-hand wire section 8 being attached to a condenser or other type of electronic component 11, and the right-hand section 9 wrapped around and attached to a terminal 10.

The tubular connector 20 is substantially the same as that shown in Figs. 1 and 3, the connector having an opening of circular cross-section, which is slightly larger in diameter than that of the two wire sections 8 and 9 through the longitudinal centerline thereof, to enable the connector to be slid over the wire sections.

A portion of the outer wall of the connector has a narrow parallel-faced slot 21 therethrough, the width of the slot being substantially equal to the diameter of the opening through the center of the connector.

This enables the solid left-hand portion of the connector 20 to be fitted over the left-hand wire section 8 in substantially the position shown in Fig. 3, after which the right-hand end of the connector may be moved to a position in alignment with the free end of the right-hand wire section 9, the slotted portion of the connector being slid along the right-hand wire section 9 in a direction perpendicular to the longitudinal axis of the wire section 9, along the slot 21, until the central end of the slot 21, which is in alignment with the circular longitudinal opening through the connector engages the circumferential edge of the right-hand wire section 9, which is located in substantially the position shown in Fig. 4, a narrow gap 14 being left between the left and right-hand wire sections of substantially the same width, and in substantially the same position relative to the connector 20, as that shown in Fig. 1.

After the connector is located in the position shown in Figs. 4 and 5, relative to the two wire sections 8 and 9, the left- and right-hand ends of the connector are soldered, or otherwise permanently attached to the adjacent portions of the wire sections 8 and 9, the soldered joints being located at 15 and 22 in the same manner as those shown in Fig. 1.

In addition to soldering the ends of the connector to the wire sections 8 and 9 at the soldered joints 15 and 22, the area between the walls of the connector facing the slot 21 may also be soldered to the right-hand wire section 9 in the manner shown in Figs. 4 and 5.

The slot 21 through the right-hand end of the connector as shown in Figs. 4 and 5, enables the connector to be slid over the wire section 9 which is attached to the terminal 10, in a direction perpendicular to the longitudinal axis of the wire section 9, and also enables the tubular connector to be used in installations in which the wire section 9 attached to the terminal is relatively short, the distance between the end of the tubular connector and the edge of the terminal being relatively short.

This type of connector is particularly advantageous in installations in which other wires and components are located close to the right-hand wire section 9, thus rendering it difficult to fit the open end of the tubular connector over the right-hand wire section 9, in the manner shown in Figs. 1 and 3.

The soldered joints 15 and 22 enable the tubular connector 12 and the wire sections 8 and 9 to which it is attached, to function in substantially the same manner as that shown in Fig. 1, the wire sections 8 and 9, after they are soldered to the tubular connector functioning in substantially the same manner as the original wire connection, before the wire is severed.

The use of a connector 12 such as that shown in Fig. 1, or the slotted connector 20 shown in Figs. 4 and 5, enables the original component, such as the condenser 11 to be restored to substantially its original position relative to the terminal 10, after the wire connecting the condenser to the terminal is severed in order to check either the component or the wiring thereof, the condenser or other component functioning in every respect in substantially the same manner as the component as originally wired, after the tubular connector is attached to the two wire sections 8 and 9 in the manner hereinbefore described.

Where a slotted connector 20 such as that shown in Fig. 4 is used, the slot 21 which is located at the right-hand end of the tubular connector may be filled with solder, during the process of soldering of the end joints 15 and 22 to the adjacent portions of the wire sections 8 and 9, thus providing a more positive grip between the right-hand end of the connector 20 and the right-hand wire section 9 and assuring uniform electrical conductivity over the entire length of the tubular connector 20.

It will be apparent to those skilled in the art that my present invention is not limited to the specific details described above and shown in the drawings, and the various modifications are possible in carrying out the features of the invention and the operation, connection and method of utilization thereof, without departing from the spirit and scope of the appended claims.

What I claim is:

1. In combination with a pair of cylindrical metal wire sections located in substantially co-axial alignment with one another, with a narrow gap between the wire sections, a tubular metal connector operative to be slid along one of said wire sections until the connector surrounds the adjoining ends of the wire sections, the tubular connector having a central opening therethrough, of a diameter slightly larger than that of the wire sections, surrounding the projecting end of one of the wire sections, said tubular connector having a radially positioned parallel-faced slot through the wall thereof, adjacent the end of the connector projecting beyond the wire section attached to the connector, the width of the slot being slightly greater than the diameter of the adjacent wire section, the tubular connector being adapted to be slid substantially radially over the adjacent wire section, along the slot through the connector until the wire section engages the inner surface of the wall of the connector at the opening therethrough, and heat fused metal means attaching each end of the connector to the adjoining wire section, the heat fused metal substantially filling the area between the surfaces of the wall of the connector, adjacent the slot, and the surface of the wire section inserted therethrough, to fixedly attach the connector to the adjacent wire section.

2. In combination with a pair of cylindrical metal wire sections located in substantially co-axial alignment with one another, with a narrow gap between the adjoining ends of the wire sections, a tubular metal connector having a longitudinal central opening therethrough of a diameter slightly larger than the diameter of the wire sections, surrounding and straddling the adjoining ends of said wire sections, said tubular connector having a radially located, substantially parallel-faced slot through the wall thereof, adjacent one end of the connector, the width of the slot being slightly greater than the diameter of the wire section fitted therethrough, the connector being adapted to be slid radially over the adjacent wire section, along the slot, until the wire section engages the inner surface of the connector, and a heat fused metal joint formed at each end of the tubular connector, and the adjoining portion of the adjacent wire section, to fixedly attach the connector to the two wire sections, the heat fused metal being deposited through the slot at one end of the connector to attach the adjacent wire section to the connector.

3. In combination with a pair of cylindrical metal wire sections located in substantially co-axial alignment with one another, a tubular metal connector surrounding one end of the first of said wire sections, said tubular connector having a radially located substantially parallel-faced slot through the wall thereof adjacent one end of the connector, the width of the slot being slightly greater than the diameter of the second wire section, the connector being operative to be slid radially over the adjacent second wire section along the slot until the wire section engages the inner surface of the connector, fused metal means attaching the unslotted end of the connector to the adjacent first wire section, and fused metal means attaching the slotted end of the connector to the adjacent second wire section.

4. The method of joining a pair of substantially cylindrical metal wire sections located in co-axial alignment with one another, the steps including sliding a tubular metal connector along the first of said wire sections until the end of the connector projects beyond the first wire section, the tubular connector having a substantially radially positioned, parallel-faced slot through the portion thereof projecting beyond the first wire section, sliding the slotted portion of the connector along the adjacent end of the second wire section in a direction substantially perpendicular to the longitudinal axis of the second wire section, depositing molten metal attaching material on the end of the connector surrounding the first wire section and the adjacent portion of the first wire section, and depositing molten metal attaching material on the slotted end of the connector and the adjacent portion of the second wire section to fixedly attach the connector to the two wire sections.

5. In combination with a pair of cylindrical metal wire sections located in substantially co-axial alignment with one another, with a narrow gap between the adjoining ends of the wire sections, one of said wire sections being fixedly attached to an electrical terminal, the second wire section being fixedly attached to an electrical component, a tubular metal connector having a longitudinal central opening therethrough of a diameter slightly larger than the diameter of the wire sections, surrounding and straddling the adjoining ends of said wire sections, said tubular connector having a radially positioned parallel-faced slot through the wall thereof, adjacent one end of the connector, the width of the slot being slightly greater than the diameter of the second wire section, the connector being adapted to be slid radially over the adjacent second wire section, along the slot, until the wire section engages the inner surface of the connector, and a heat fused metal joint formed at each end of the tubular connector and the adjoining portion of the adjacent wire section, said fused metal joints being operative to fixedly attach the connector to the adjoining wire sections, the heat fused metal being deposited through the slot at one and of the connector, to attach the adjacent wire section to the connector.

6. In combination with a pair of cylindrical metal wire sections located in substantially co-axial alignment with one another, with a narrow gap between the adjoining ends of the wire sections, the first of said wire sections being fixedly attached to an electrical terminal, the second wire section being fixedly attached to an electrical component, a tubular connector having a longitudinal central opening therethrough of a diameter slightly larger than the wire sections, surrounding the projecting end of the second of said wire section, said tubular connector having a radially located substantially parallel-faced slot through the wall thereof adjacent the end of the connector projecting beyond the second wire section, the width of the slot being slightly greater than the diameter of the first wire section, the tubular connector being operative to be slid radially over the adjacent first wire section, along the slot through the connector, until the wire section is in co-axial alignment with the longitudinal opening through the connector, a heat fused metal joint formed between the unslotted end of the tubular connector and the adjoining portion of the second wire section, and a heat fused metal joint formed between the slotted end of the tubular connector and the adjoining portion of the first wire section, the heat fused metal filing the area between the surfaces of the wall of the connector adjacent the slot, and the second wire section inserted therethrough, to fixedly attach the connector to the second wire section, said heat fused metal joints being operative to fixedly attach the tubular connector to the adjoining wire sections.

References Cited in the file of this patent

UNITED STATES PATENTS

| | | |
|---|---|---|
| 294,549 | Waring | Mar. 4, 1884 |
| 355,611 | Howson | Jan. 4, 1887 |
| 1,744,190 | Wilson | Jan. 21, 1930 |

FOREIGN PATENTS

| | | |
|---|---|---|
| 666,667 | Great Britain | Feb. 13, 1952 |